Feb. 26, 1963   H. R. NIEMOTH   3,079,179
COAXIAL TUBE COUPLING
Filed Dec. 23, 1960
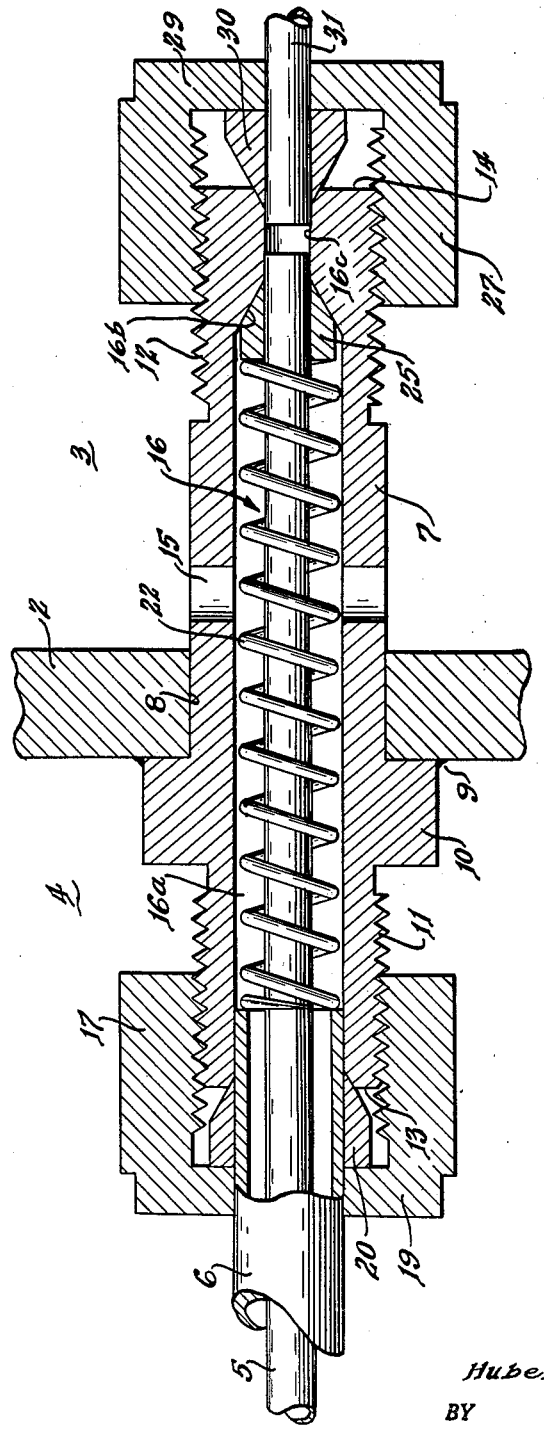
INVENTOR.
Hubert R. Niemoth
BY

3,079,179
COAXIAL TUBE COUPLING

Hubert R. Niemoth, Elmhurst, Ill., assignor to the United States of America as represented by the United States Atomic Energy Commission
Filed Dec. 23, 1960, Ser. No. 78,192
1 Claim. (Cl. 285—133)

The invention relates to a novel quick-attaching and -disconnecting metal-to-metal coupling for coaxial tubes.

In reactors of the boiling-water type difficulty has been experienced in conducting the pressure from the liquid in the core to a pressure-sensing device outside the reactor due to the fact that the static water within the pressure-conveying tube is converted to steam as it passes through the steam zone. This increases the pressure within the tube and conveys a false pressure to the sensing device.

To overcome this difficulty the pressure-conveying tube is provided with a coaxial cooling tube of larger diameter which bathes the outside of the pressure-conveying tube which flowing water of sufficient coolness to prevent the static water within the smaller tube from being converted to steam. Difficulty is encountered, however, in joining this coaxial arrangement of tubes to the source of the cooling water; since metal-to-metal joints are mandatory in a reactor, available coaxial coupling devices employing plastic seals cannot be used; an elaborate assembly of tube junctions is used. This assembly of threaded joints requires considerable time to take it apart so as to get it out of the way when fuel elements are withdrawn from the reactor. Sometimes, in an emergency, this has to be done by remote control, and in such a case the elaborateness of the assembly is an obstacle to prompt action.

It is, accordingly, an object of the invention to provide a coaxial metal-to-metal pipe coupling to a source of liquid which may be easily and quickly attached and detached.

Other objects will become apparent as the detailed description proceeds.

The FIGURE is a sectional view of the device of the invention in one of its many possible applications.

2 is a wall separating a chamber 3, filled with cooling water, from a steam chamber 4 of a reactor of the boiling-water type. It is understood that during reactor operation the cooling water in chamber 3 is at a lower temperature than the water in the reactor core. The steam chamber 4 is spaced from the reactor core and above the water line. 5 is an inner pressure tube that is filled with static water, which originates within the water in the reactor core, and leads to the device of the invention as shown. A cooling tube 6 surrounds the pressure tube 5 in coaxial spaced relationship and conducts a stream of cooling water from chamber 3 around tube 5 so as to prevent the conversion of the static water within tube 5 to steam within steam chamber 4.

A hollow fitting 7 is connected with the tubes 5 and 6, and passes through a close-fitting aperture 8 of wall 2 and is firmly secured thereto by annular weld 9 around the outer edge of flange 10 of the fitting 7. The fitting 7 has threaded portions 11 and 12, respectively, adjacent ends 13 and 14, which are located in steam chamber 4 and water chamber 3, respectively. The fitting 7 also has a plurality of lateral holes 15 which are spaced from the ends and are located in the portion thereof lying in the water chamber 3 so as to connect the water chamber 3 with a longitudinal passage 16 extending through the fitting 7. More particularly, the lateral holes 15 open into a portion 16a of relatively large diameter, of the passage 16. The portion 16a extends from the end 13 of the fitting to a region near the end 14, at which region an internal frusto-conical seat 16b is formed in the fitting 7. Besides the portion 16a and the seat 16b, the passage 16 also has a portion 16c of relatively small diameter extending from the end 14 to the seat 16b.

Inner pressure tube 5 passes through the end 13 of the fitting 7 and the passage 16, almost to the end 14, and outer cooling tube 6 enters the fitting 7 at its end 13 and extends for only a comparatively small distance into the fitting 7.

A collar 17 has threaded engagement with the portion 11 of the fitting 7 and has an annular flange 19 bearing against an annular frusto-conical shoulder 20, which is firmly fixed to the outside of the tube 6 as by welding. Rotation of the collar 17 forces the shoulder 20 against, and partially into, the fitting 7 at its end 13, thus forming a water-tight seal between tube 6 and the portion 16a of passage 16 in fitting 7.

A coil spring 22 in the form of a helix surrounds tube 5 within passage 16 and has one end abutting the end of outer tube 6 in the fitting 7 and the other end abutting an annular frusto-conical shoulder 25, which is firmly fixed to tube 5 as by welding. When inner collar 17 is rotated the pressure of flange 19 thereof acting on shoulder 20 causes tube 6 to exert pressure on spring 22, and spring 22 in turn bears against shoulder 25 to as to cause it to seat against the seat 16b in fitting 7. Thus a water-tight seal is formed between inner tube 5 and the portion 16c of passage 16 in fitting 7 at the same time, and by the same operation that forms the seal between outer tube 6 and the portion 16a of passage 16 in fitting 7. Conversely, a simple unloosening of inner collar 17 breaks both seals simultaneously and permits tube 5 and 6, the associated shoulders 20 and 25, and the coil spring 22 to be withdrawn together, without the time-consuming adjustment which would be necessary if conventional equipment were used.

To complete the assembly, a collar 27, threaded on the threaded portion 12 of the fitting 7, has an annular flange 29 bearing against an annular frusto-conical shoulder 30, fixed to the outside of a tube 31. Rotation of collar 27 moves shoulder 30 against, and partially into, the fitting 7 at its end 14, whereby a seal is formed between the outer pressure tube 31 and the portion 16c of the passage 16 in the fitting 7. The tubes 5 and 31 are thus connected with one another, since both are sealed to the portion 16c of the passage 16. It will be understood that outer pressure tube 31 passes out of the reactor to a pressure-sensing instrument of a kind known to the art.

All parts of the device of the invention are metal.

It will be understood that this invention is not to be limited to the details given herein, but that it may be modified within the scope of the appended claim.

What is claimed is:

A quick-attaching and -detaching all-metal device for coupling within a nuclear reactor, a pair of metal inner and outer coaxial tubes to a metal connecting tube of the same diameter as the inner coaxial tube, the inner coaxial tube having a protruding length beyond the outer coaxial tube, comprising a metal fitting longer than the said protruding length and having a first set of external threads at a first end, a second set of external threads at a second end, a plurality of lateral holes and a longitudinal passage throughout its length, the said passage consisting of, successively, a first tapered portion tapering inwardly from the first end of the fitting to a diameter sufficient to snugly and slidably fit the outer coaxial tube, a first straight portion having a diameter snugly and slidably fitting the outer coaxial tube over the terminal portion of its length and continuing beyond the end of said outer tube for an additional distance slightly less than the said protruding length of the inner tube, thereby occupying a major portion of the length of the fitting, a second tapered portion tapering from the diameter of the first straight portion to a diameter snugly and slidably fitting the inner coaxial tube, a second straight portion having a diameter snugly and slidably fitting the inner coaxial tube over the terminal portion of its length and continuing beyond the end of said inner tube a short distance, and a third tapered portion tapering inwardly from said second end of the fitting to the diameter of the second straight portion, all portions of said passage being aligned along a common axis and the said lateral holes leading into the said first straight portion; an annular metal external extension on the outer coaxial tube adjacent its end having a square outer shoulder and a tapered inner shoulder mating with the first tapered portion of the passage, a first collar threadably mounted on said first set of threads on the fitting and urging the said tapered inner shoulder into fluid-tight, metal-to-metal connection with the said first tapered portion, an annular metal extension on the inner coaxial tube adjacent its end having a square shoulder on one side and a tapered shoulder on the other side mating with the said second tapered portion of the passage, a helical spring surrounding the inner coaxial tube throughout a major portion of its said protruding length within the first straight portion of the passage, the said spring abutting the end of the outer coaxial tube and the square shoulder of the annular extension on the inner coaxial tube, whereby on tightening the first collar the tapered shoulder of the annular extension on the inner coaxial tube is urged into a fluid-tight, metal-to-metal connection with the second tapered portion of the passage, an annular metal extension on the connecting tube having a square outer shoulder and a tapered inner shoulder mating with the third tapered portion of the passage, and a second collar threadably mounted on said second set of threads on the fitting and urging the said tapered inner shoulder on the extension on the connecting tube into a fluid-tight, metal-to-metal connection with said third tapered portion of the passage.

References Cited in the file of this patent

UNITED STATES PATENTS

| | | |
|---|---|---|
| 782,552 | Glauber | Feb. 14, 1905 |
| 1,017,813 | Schuermann | Feb. 20, 1912 |
| 2,399,539 | Braithwaite | Apr. 30, 1946 |
| 2,983,506 | Bertsch | May 9, 1961 |